Oct. 4, 1927.
H. SEBELL
NONSKID DEVICE FOR AUTOMOBILES
Filed Nov. 8, 1926
1,643,959
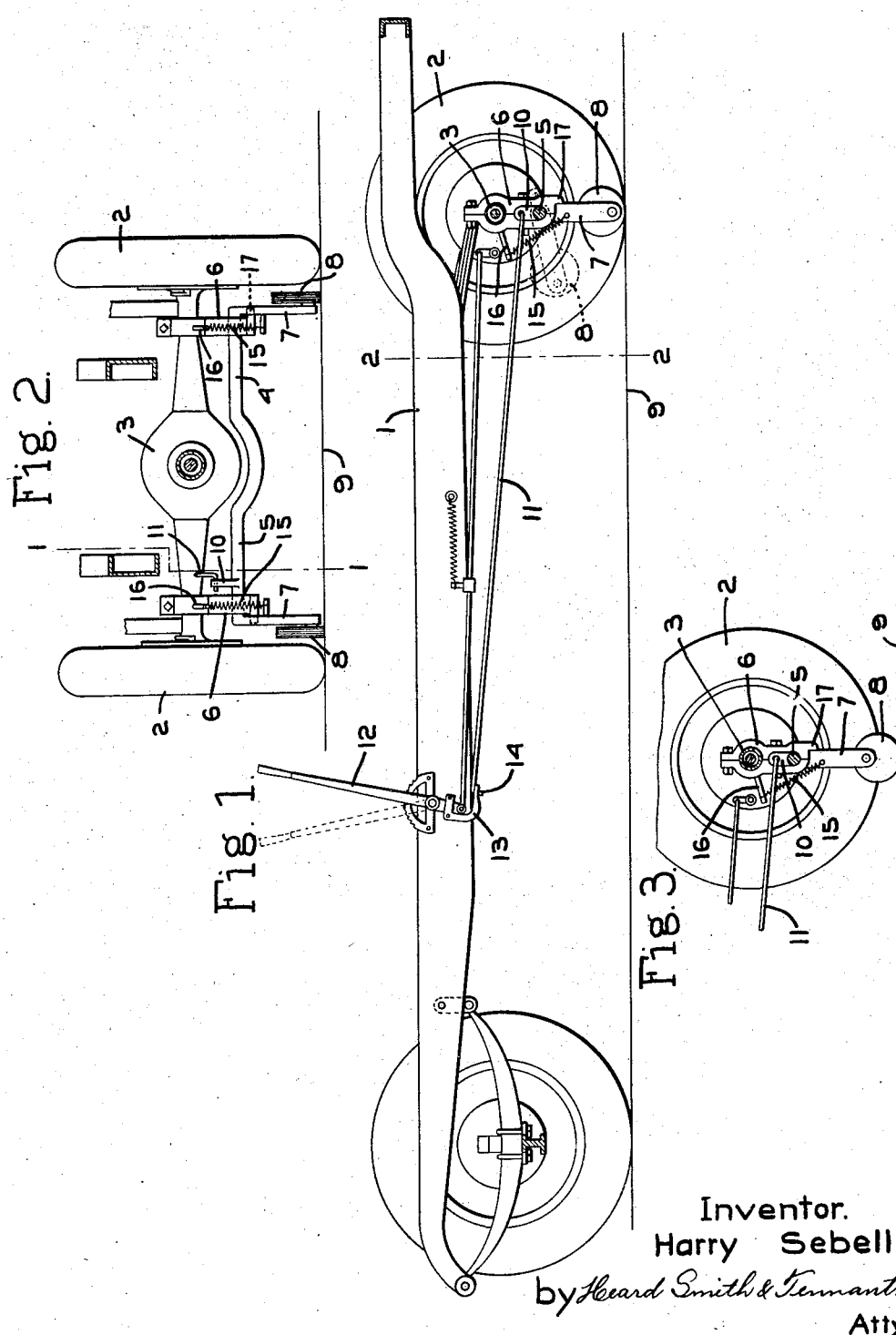
Inventor.
Harry Sebell
by Heard Smith & Tennant.
Attys Patented Oct. 4, 1927.

1,643,959

UNITED STATES PATENT OFFICE.

HARRY SEBELL, OF BOSTON, MASSACHUSETTS.

NONSKID DEVICE FOR AUTOMOBILES.

Application filed November 8, 1926. Serial No. 146,862.

This invention relates to a non-skid device for automobiles and one of the objects is to provide a non-skid device which is attached to the automobile chassis instead of to the tires and which is arranged so that it can be moved from an inoperative position to an operative position as occasion demands the use of some non-skid attachment.

Another object of the invention is to provide a non-skid attachment of this type which when in operative position will serve to raise the traction wheels of the automobile intermittently from the ground thus giving the wheels an opportunity to regain their tractive contact with the ground in case they begin to slip or slide.

In order to give an understanding of the invention I have illustrated in the drawings a selected embodiment thereof which will now be described after which the novel features will be pointed out in the appended claims.

Fig. 1 is a fragmentary sectional view illustrating an automobile with my improvements applied thereto;

Fig. 2 is a section on the line 2—2, Fig. 1;

Fig. 3 is a section on the line 3—3, Fig. 2.

In the drawings 1 indicates the chassis of an automobile, 2 the rear or traction wheels and 3 the rear axle housing.

My invention contemplates the use of an anti-skid member which is secured to the axle housing 3 and is adapted to be moved from an inoperative position in which it is ineffective to an operative position in which latter position it functions to raise the traction wheels 2 from the ground intermittently. This anti-skid member is indicated generally at 4 and it is shown as comprising a cross member 5 which is journalled in bearing members 6 that are clamped to the rear axle housing 3 and depending arms 7 at the ends of the cross member which carry at their lower ends eccentrically mounted rolls or wheels 8. The anti-skid member can swing in the bearings 6 from its inoperative position shown in dotted lines Fig. 1 to its operative position shown in full lines and when in operative position the rolls 8 will have contact with the road surface 9.

The rolls or wheels 8 are eccentrically mounted on the arms 7 and the construction is such that when the arms are in their operative position shown in full lines Fig. 1 the low portions of the wheels 8 have just about the same radial distance from the axis of rotation of the wheels 2 as the periphery of the tire, and hence when in this position both the rear wheels 2 and the wheels 8 will contact with the road surface 9. The wheels 8 have sufficient traction on the road surface 9 so that as the car moves forward they will turn and because of their eccentric mounting the turning of the wheels or rolls 8 will raise the automobile wheels 2 off from the ground intermittently as shown in Fig. 3. This intermittent raising of the wheels 2 from the ground will serve to break up any skidding action and enable the traction wheels 2 to regain again their tractive contact with the road surface 9.

It is the intention of this invention that the non-skid device will be normally held in its inoperative position as shown by dotted lines Fig. 1, in which position the wheels 8 are raised considerably above the road surface, and that said device may be thrown into action whenever the car begins to skid or the traction wheels 2 begin to slip. I have, therefore, provided means whereby the non-skid device may be thrown into or out of operative position at the will of the driver of the car.

As herein shown the cross bar 5 of the non-skid device is provided with an upstanding arm 10 to which is connected a pull rod 11 that in turn is connected to some convenient lever within reach of the operator. In order not to complicate the controls of an automobile I propose to connect the pull rod 11 to the emergency brake lever 12 so that a movement of said lever will throw the non-skid device into its operative position. In the construction shown the emergency lever 12 is provided at its lower end with an extension bracket 13 and the pull connection 11 is formed at its forward end with a hook 14 which hooks into an aperture in the bracket.

The non-skid device is acted on by springs which normally tend to hold it in its raised or operative position. Two such springs 15 are herein shown and each spring is connected at one end to one of the arms 7 and at the other end to an arm 16 rigid with the bearing member 6. Each bearing member is also provided with a stop finger 17 which engages the back side of the arm 7 and limits its backward swinging movement.

When the emergency brake is released and normal running conditions obtain the anti-skid device will be held in its raised or inoperative position by the springs 15. If at any time the driver of the automobile feels that the automobile is skidding or that the traction wheels are slipping he will pull rearwardly on the brake lever 12 which will throw the anti-skid device into the operative position shown in full lines Fig. 1. As the arms 7 swing into the full line position Fig. 1 the rolls or wheels 8 will naturally be turned about their axes into the position shown in Fig. 1 with the low portion in contact with the road surface because if either roll or wheel 8 is in such an angular position that the high point thereof strikes the road surface as the arms 7 are swung downwardly the engagement of the road surface with the wheel will naturally turn it into the position shown in Fig. 1. When in this position the wheels 8 will have sufficient traction so that the forward movement of the automobile will cause them to turn although they will only partially support the weight of the car. However, as the car moves forwardly the friction between the wheels 8 and the road surface causes the wheels to turn and in turning the rear axle will be raised intermittently as shown in Fig. 3 thus lifting the traction wheels 2 of the automobile intermittently from the ground. This breaks up the skidding tendency of the wheels 2 and enables them to regain their tractive contact with the road surface and thus prevents any skidding effect.

Where the anti-skid device is connected to the emergency brake as shown the operation of drawing the emergency brake lever 12 backwardly will result in both applying the emergency brake and bringing the anti-skid device into its operative position. If the automobile wheels are slipping or skidding and the operator throws the anti-skid device into its operative position the emergency brake will be simultaneously applied and when the wheels 2 are raised from the ground the emergency brake will bring them to rest or at least reduce the rotative speed before they are allowed to come in contact with the road surface again and, therefore, when they do thus come in contact they are either stationary or rotating at a slower speed than that corresponding to the forward movement of the car. There is thus added friction developed between the automobile wheels 2 and the road surface which tends to slow up the car and at the same time will tend to correct any sidewise slipping tendency of the wheels 2.

The peripheries of the wheels 8 may be made in any suitable way so as to give the proper frictional contact with the road surface 9. I have herein shown said wheels as provided with annular V ribs although this particular construction is not important.

I claim.

1. The combination with an automobile, of a non-skid device therefor comprising two arms pivotally connected to the rear axle housing, a roll pivoted eccentrically to the end of each arm, and means to swing the arms into operative position with the rolls in contact with the road surface, whereby the rotation of the rolls will periodically lift the rear wheels from contact with the road surface.

2. The combination with an automobile, of a non-skid device therefor comprising two arms pivotally connected to the rear axle housing, a roll pivoted eccentrically to each arm, a spring normally holding said arms with the rolls elevated above the road surface, and means to swing the arms into operative position with the rolls in contact with the road surface, whereby rotation of the rolls will periodically lift the rear wheels of the car from contact with said road surface.

3. The combination with an automobile, of a non-skid device therefor comprising two arms pivotally connected to the automobile, a roll pivoted eccentrically to the end of each arm, said arms being normally held in raised position in front of their pivot points, means to swing the arms into operative position with the rolls in contact with the road surface and stops to limit the further swinging movement of said arms.

In testimony whereof, I have signed my name to this specification.

HARRY SEBELL.